(No Model.)
G. S. HARVEY.
COMBINED COLLAR AND HAME.
No. 391,708. Patented Oct. 23, 1888.
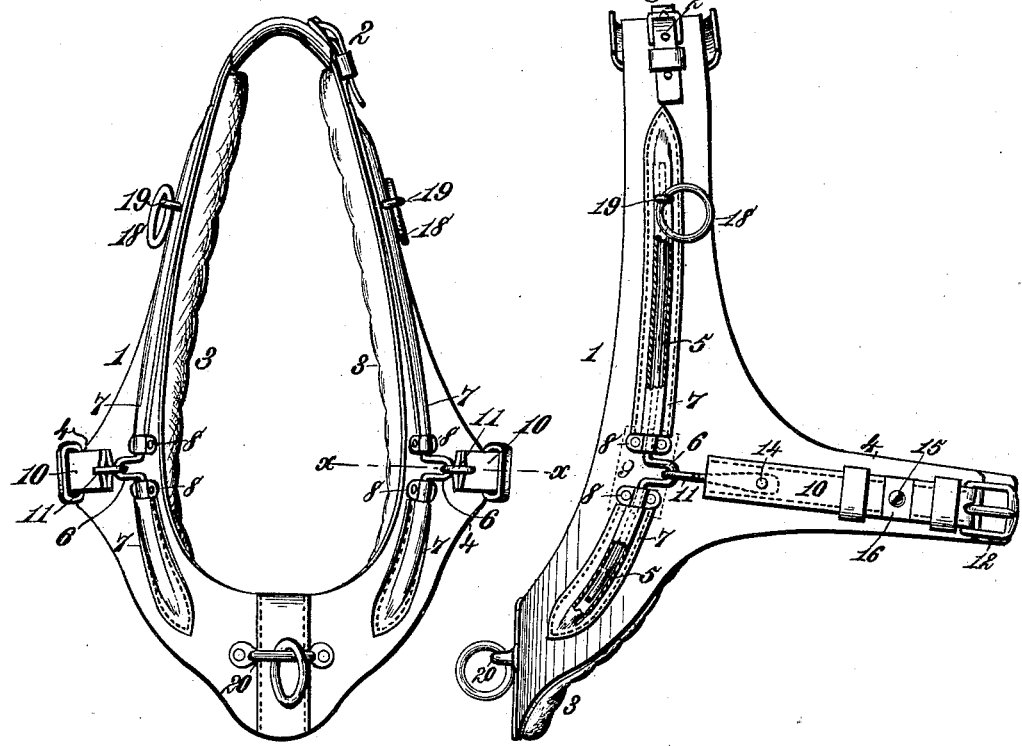
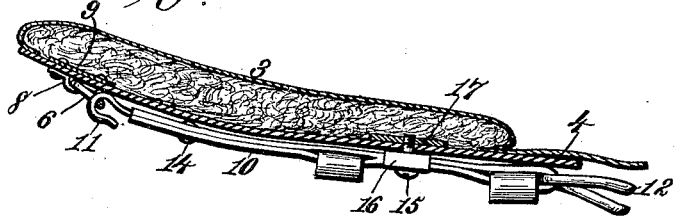
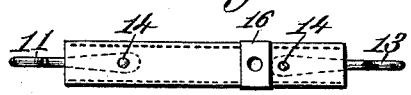
Witnesses,
Robt Scott
J. A. Rutherford
Inventor
George S. Harvey
By James L. Norris
Atty.

UNITED STATES PATENT OFFICE.

GEORGE S. HARVEY, OF HAWKINSVILLE, GEORGIA.

COMBINED COLLAR AND HAME.

SPECIFICATION forming part of Letters Patent No. 391,708, dated October 23, 1888.

Application filed August 4, 1888. Serial No. 281,981. (No model.)

*To all whom it may concern:*

Be it known that I, GEORGE S. HARVEY, a citizen of the United States, residing at Hawkinsville, in the county of Pulaski and State of Georgia, have invented new and useful Improvements in Collars and Hames, of which the following is a specification.

This invention relates to a combined horse-collar and hame; and it consists in the construction and combination of parts, hereinafter described and claimed.

In the annexed drawings, illustrating the invention, Figure 1 is a front view of my improved collar and hame. Fig. 2 is a side view of the same. Fig. 3 is a section of one side on the line $x$ $x$ of Fig. 1. Fig. 4 is a modification in the hame-tug.

The numeral 1 designates the collar, which is of the usual construction, closed or continuous at bottom, and adapted to be opened at top, where it is secured by a strap and buckle, 2, in the ordinary manner. The collar is made of leather and provided with a pad, 3, of any suitable material, to prevent chafing. Projecting rearward from each side of the collar in line with the hame-tug is a fender, 4, which is formed integral with the collar and its pad, the padded under surface of the fenders serving to protect the shoulders of the animal from the pressure of the traces.

The two hame-pieces 5—one on each side of the collar—consist of metal rods or bars that are each swiveled on the collar to axially rotate, and bent at a point below its center to form a loop, 6, for attachment of the hame-tug. Each hame-piece is swiveled to the collar by leather covering-pieces 7, extending along and over the hame above the loop 6 and firmly stitched to the collar. The hame is also fastened to the collar by metal clasps 8, that are riveted to the collar above and below the hame-tugs, a metal plate, 9, being placed beneath the collar to afford a bearing for the rivets or brads and to prevent them from pulling out.

The hame-tug 10 is provided with a hook, 11, at one end for attachment to the loop 6, and at the other end it may have a buckle, 12, as shown in Fig. 1, or a hook, 13, as in Fig. 4, the latter being preferable for the attachment of chain traces. The hooks 11 and 13 may have their shanks perforated or provided with holes for the passage of rivets 14, after the tug has been stitched around or otherwise secured to said hooks. The hame-tug 10 is attached also to the fender 4 by means of a screw, 15, which is passed through the tug from its outer side at a point about four inches from the hame. This screw will go through a plate, 16, on the tug, and is screwed into a small metal plate, 17, attached to the under side of the fender, which plate is covered by the fender-pad, so as not to come in contact with the animal. By withdrawing the screws 15 the tugs can be detached and replaced by others of any desired style.

The numeral 18 designates rings for the driving-reins, which rings are secured to their place by means of staples 19, passing through the rings and astride the hames 5 through the collar, on the under side of which they are secured.

To the lower front portion of the collar is secured a staple, 20, which may be used for the attachment of choke-strap or breast-chains, if either are desired.

The advantages of this collar and hame consist in the ease with which it can be worn, and in the facility of attaching different kinds of tugs and traces, which will be readily appreciated.

What I claim as my invention is—

1. The combination, with a collar, of the hames 5, consisting of metallic rods or bars provided with loops 6, the leather covering-pieces 7, and the metal clasps 8 for securing the hames to the collar, substantially as described.

2. The combination, with a padded collar having padded fenders 4, of the hames 5, secured to said collar and provided with loops 6, the hame-tugs 10, attached to said loops, and the screws 15, for detachably securing the tugs to the fenders, substantially as described.

3. The combination, with a leather horse-collar, 1, of permanently-attached hame-pieces 5, each composed of a metallic rod swiveled to the collar to axially rotate and provided with a loop, 6, and the hame-tugs 10, having hooks to engage the loops, substantially as described.

In testimony whereof I affix my signature in presence of two witnesses.

GEO. S. HARVEY.

Witnesses:
R. L. PARTIN,
E. D. MANN.